(12) United States Patent
Fujimoto

(10) Patent No.: US 8,464,644 B2
(45) Date of Patent: Jun. 18, 2013

(54) ROTARY TABLE ASSEMBLY

(75) Inventor: Kazuhisa Fujimoto, Higashiosaka (JP)

(73) Assignee: Nikken Kosakusho Works, Ltd., Daito-shi (JP)

( * ) Notice: Subject to any disclaimer, the term of this patent is extended or adjusted under 35 U.S.C. 154(b) by 0 days.

(21) Appl. No.: 13/288,262

(22) Filed: Nov. 3, 2011

(65) Prior Publication Data

US 2013/0047896 A1 Feb. 28, 2013

(30) Foreign Application Priority Data

Aug. 26, 2011 (JP) ................................ 2011-185152

(51) Int. Cl.
*A47B 85/00* (2006.01)

(52) U.S. Cl.
USPC .......................................... 108/20; 74/813 R

(58) Field of Classification Search
USPC .................. 108/20, 21, 22, 94; 74/16, 813 R, 74/826
See application file for complete search history.

(56) References Cited

U.S. PATENT DOCUMENTS

| | | | | |
|---|---|---|---|---|
| 4,161,893 A | * | 7/1979 | Black | 74/813 R |
| 5,201,249 A | * | 4/1993 | Sterenberg | 74/825 |
| 5,440,952 A | * | 8/1995 | Nakashima et al. | 74/813 L |
| 5,711,192 A | * | 1/1998 | Vasilantone | 74/827 |
| 6,240,807 B1 | * | 6/2001 | Hebener et al. | 74/813 R |
| 6,279,445 B1 | * | 8/2001 | Rosene et al. | 83/698.91 |
| 7,143,665 B2 | * | 12/2006 | Ettori | 74/813 C |
| 7,275,460 B2 | * | 10/2007 | Gunter | 74/813 R |
| 2008/0302208 A1 | * | 12/2008 | Yonenaga | 74/813 R |
| 2010/0275726 A1 | * | 11/2010 | Tatsuda et al. | 74/813 R |
| 2010/0313708 A1 | * | 12/2010 | Tatsuda | 74/813 R |

FOREIGN PATENT DOCUMENTS

| | | |
|---|---|---|
| JP | H02-093592 U | 7/1990 |
| JP | H04-032835 U | 3/1992 |
| JP | 2003-071667 | 3/2003 |
| JP | 3664471 | 6/2005 |

\* cited by examiner

*Primary Examiner* — Jose V Chen
(74) *Attorney, Agent, or Firm* — W. F. Fasse

(57) ABSTRACT

A rotary table assembly is configured to prevent torsional deformation of a sealing member on an outer peripheral surface of a rotary joint. The rotary joint has a distributor and a center shaft, which includes two hollow cylindrical center shafts respectively inserted into a through hole from opposite front and back surface sides of a rotatable table. The sealing member makes contact with the outer peripheral surface of the hollow cylindrical center shaft positioned near the front surface of the rotatable table. The distributor has a top region that is successively inserted from the back surface side of the rotatable table into the two hollow cylindrical center shafts, and a basal portion secured to a frame.

3 Claims, 3 Drawing Sheets

ROTARY TABLE ASSEMBLY

BACKGROUND OF THE INVENTION

1. Field of the Invention

The present invention relates to a rotary joint used to supply pressurized fluid, such as air and hydraulic oil, to a rotatable table of a rotary table assembly.

2. Description of the Related Art

A rotary joint of a rotary table assembly includes a rotational part attached to a rotatable table, a non-rotational part attached to a frame and a plurality of fluid passages formed in the rotational part and non-rotational part, and is used to supply pressurized fluid from the non-rotational part to the rotational part through the fluid passages. An example of conventional rotary joints is disclosed in Japanese Patent No. 3664471. The rotary joint in the patent disclosure is provided to a rotary table assembly including a rotatable table and a frame that rotatably supports the rotatable table from the back surface side of the rotatable table. To assemble the rotary table assembly, a hollow cylindrical shaft (rotational part) to be attached to the rotatable table and a columnar distributor (non-rotational part) to be attached to the frame are inserted together into the rotary table assembly from the back surface side of the rotatable table.

More details of the rotary joint disclosed in Japanese Patent No. 3664471 will be given. The columnar distributor is inserted into a center bore of the hollow cylindrical shaft. Around the outer peripheral surface of the hollow cylindrical shaft, an O ring is provided to prevent entry of foreign matter from the rotatable table side into the rotary table assembly. The O ring is disposed relatively near the rotatable table and interposed between the outer peripheral surface of the shaft and the inner peripheral surface of a support member on the rotatable table side.

The aforementioned conventional rotary joint has the following problems. The first problem is the long insertion distance. To insert a shaft into a rotary table assembly from the back surface side of a rotatable table, an end of the shaft, the end to be positioned on the rotatable table side, is first inserted and then the shaft is pushed in until passing through the rotary table assembly from one end to the other in an axial direction. The distance in which the shaft moves to be completely inserted in the rotary table assembly becomes long. During insertion, the O ring attached around the outer peripheral surface of the shaft makes sliding contact with the inner peripheral surface of the support member of the rotatable table, and consequently is torsionally deformed in the axial direction. The torsionally deformed O ring may remain in an improper shape at an improper position, and therefore may not be able to prevent entry of foreign matter.

The second problem is the inconvenience of attaching and replacing a large number of seals that are equidistantly disposed on the inner peripheral surface of the shaft in the axial direction and used to seal pressurized-fluid passages. In other words, because the shaft and distributor are axially long and thin, an operator cannot put his/her hand into the center bore of the shaft, and especially, cannot reach the rotational seals positioned away from opposite openings of the center bore.

SUMMARY OF THE INVENTION

In view of the above-described circumstances, the present invention has an object, in the first aspect, to provide a rotary table assembly configured so that sealing members, which are attached around the outer peripheral surface of a rotary joint to prevent entry of foreign matter, are not torsionally deformed during assembly and checkups of the rotary table assembly. In the second aspect, the present invention has an object to provide a rotary table assembly configured so that rotational seals for sealing the pressurized-fluid passages of the rotary joint can be readily attached and replaced.

For the purpose of achieving the rotary table assembly, the rotary table assembly according to the present invention is premised to include a rotatable table having a through hole extending along an axis; a frame rotatably supporting the rotatable table from the back surface of the rotatable table; a rotary joint including a hollow cylindrical center shaft having a plurality of rotatable-table-side fluid passages and a distributor having a plurality of frame-side fluid passages and being inserted into a center bore of the center shaft, the rotary joint being disposed in the through hole to receive and supply fluid between the frame-side fluid passages and the rotatable-table-side fluid passages; and a sealing member interposed between the outer peripheral surface of the center shaft and the peripheral surface of the through hole.

The center shaft includes a hollow cylindrical rotatable-table-side center shaft that is inserted into the through hole from the front surface side of the rotatable table and has the outer peripheral surface making contact with the sealing member, and a hollow cylindrical frame-side center shaft that is inserted into the through hole from the back surface side of the rotatable table. The frame-side center shaft and the rotatable-table-side center shaft are secured to the rotatable table.

The distributor includes a basal portion and a top region extending from the basal portion in an axial direction. The top region is inserted from the back surface side of the rotatable table into a center bore of the frame-side center shaft and a center bore of the rotatable-table-side center shaft in succession. The basal portion is secured to the frame.

Communication ports of first frame-side fluid passages formed on the outer peripheral surface of the top region are in communication with communication ports of first rotatable-table-side fluid passages formed on the inner peripheral surface of the rotatable-table-side center shaft. Communication ports of second frame-side fluid passages formed on the outer peripheral surface of the top region are in communication with communication ports of second rotatable-table-side fluid passages formed on the inner peripheral surface of the frame-side center shaft.

According to the present invention, the center shaft is axially separated into two components, a rotatable-table-side center shaft and a frame-side center shaft. The rotatable-table-side center shaft to be placed in proximity of the front surface of the rotatable table is inserted from the front surface side of the rotatable table into the through hole of the rotatable table and is secured to the rotatable table. This can reduce the insertion distance of the rotatable-table-side center shaft in comparison with the case where a center shaft is inserted from the back surface side of the rotatable table, thereby maintaining the ring-shaped sealing member between the outer peripheral surface of the rotatable-table-side center shaft and the peripheral surface of the through hole of the rotatable table without being twisted.

The hollow cylindrical center shaft, which is a counterpart of the distributor, can be separated into a shaft on the rotatable table side and a shaft on the frame side, which means each shaft is reduced in axial size. Therefore, even if the rotary joint is long and thin, an operator can separate the shaft and put his/her hand to the inner peripheral surfaces of the separated shafts for easy attachment and replacement of rotational seals for sealing the passages.

The center shaft of the present invention is configured to separate into the center shaft on the rotatable table side and the center shaft on the frame side and cannot make up the rotary joint without either one of the center shafts. The distributor may be in the shape of a solid circular column or hollow cylinder.

The center shaft is secured to the rotatable table and rotates together. The rotatable-table-side center shaft and frame-side center shaft, which make up the center shaft, are secured to the rotatable table, but the method is not specifically limited. In an embodiment, the rotatable-table-side center shaft is secured to the rotatable table with a first bolt, and the frame-side center shaft is secured to the rotatable table with a second bolt. In a preferred embodiment, the rotary joint can further include a coupling member for fixedly coupling the frame-side center shaft and rotatable-table-side center shaft. According to the embodiment, the axially separated center shafts on the rotatable table side and frame side can be reliably coupled. Even if the rotatable-table-side fluid passages are formed across the rotatable-table-side center shaft and frame-side center shaft, the rotatable-table-side fluid passages formed in the rotatable-table-side center shaft and the rotatable-table-side fluid passages formed in the frame-side center shaft can be reliably connected. The coupling member is, for example, a bolt.

Connecting a rotatable-table-side fluid passage formed in the center shaft and a frame-side fluid passage formed in the distributor establishes a single continuous fluid passage of the rotary joint. More specifically, a communication port is formed at a position where the rotatable-table-side fluid passage meets the inner peripheral surface of the center shaft, and a communication port is formed at a position where the frame-side fluid passage meets the outer peripheral surface of the distributor. Both the communication ports are positioned the same with respect to axial direction. An annular groove is formed, axially at the same position as the communication ports, on the shaft's inner peripheral surface and/or distributor's outer peripheral surface. The annular groove between the shaft's inner peripheral surface and the distributor's outer peripheral surface, which face each other and rotate with respect to each other, enables constant communication between the communication port on the shaft side and the communication port on the distributor side even if the communication ports are at any relative-rotational position.

With a plurality of the corresponding communication ports equidistantly provided in the axial direction, the rotary joint has a plurality of passages in parallel with each other. Interposed between the adjacent communication ports in the axial direction is a ring-shaped rotational seal that seals the corresponding communication ports.

The parallel fluid passages are used to supply fluid, such as liquid (e.g. hydraulic oil) and highly pressurized air, to the front surface of the rotatable table. The pressure applied to the fluid can be different; however, it is not appropriate to arrange a communication port of a passage through which relatively high pressure air flows axially next to a communication port of a passage through which relatively low pressure liquid flows from the viewpoint of seal performance of the rotational seals.

In a preferred embodiment, the fluid passages may be grouped so that air or liquid flows through the first frame-side fluid passages and first rotatable-table-side fluid passages, while the other flows through the second frame-side fluid passages and second rotatable-table-side fluid passages. According to the embodiment, the communication ports of the fluid passages for air are collectively located on the rotatable-table-side center shaft, while the communication ports of the fluid passages for liquid are collectively located on the frame-side center shaft, thereby suitably preventing air or liquid leakage between the center shaft's inner peripheral surface and the distributor's outer peripheral surface. Alternatively, of course, the communication ports of the fluid passages for liquid can be located on the rotatable-table-side center shaft, while the communication ports of the fluid passages for air can be located on the frame-side center shaft.

In an embodiment, the first frame-side fluid passages and first rotatable-table-side fluid passages are configured to allow only air to pass therethrough, while the second frame-side fluid passages and second rotatable-table-side fluid passages are configured to allow only liquid to pass therethrough. In another embodiment, the first frame-side fluid passages and first rotatable-table-side fluid passages are configured to allow only liquid to pass therethrough, while the second frame-side fluid passages and second rotatable-table-side fluid passages are configured to allow only air to pass therethrough.

According to the present invention, the ring-shaped sealing member is interposed between the outer peripheral surface of the rotatable-table-side center shaft and the peripheral surface of the through hole of the rotatable table so as not to be torsionally deformed. In addition, since the center shaft can be separated in the axial direction and each of the separated shafts is axially shorter, an operator can easily put his/her hand in the center bores of the separated center shafts and thereby can easily attach the rotational seals to the inner peripheral surface of the center shaft and replace the rotational seals deteriorated over time.

DETAILED DESCRIPTION OF THE INVENTION

Figure 1:
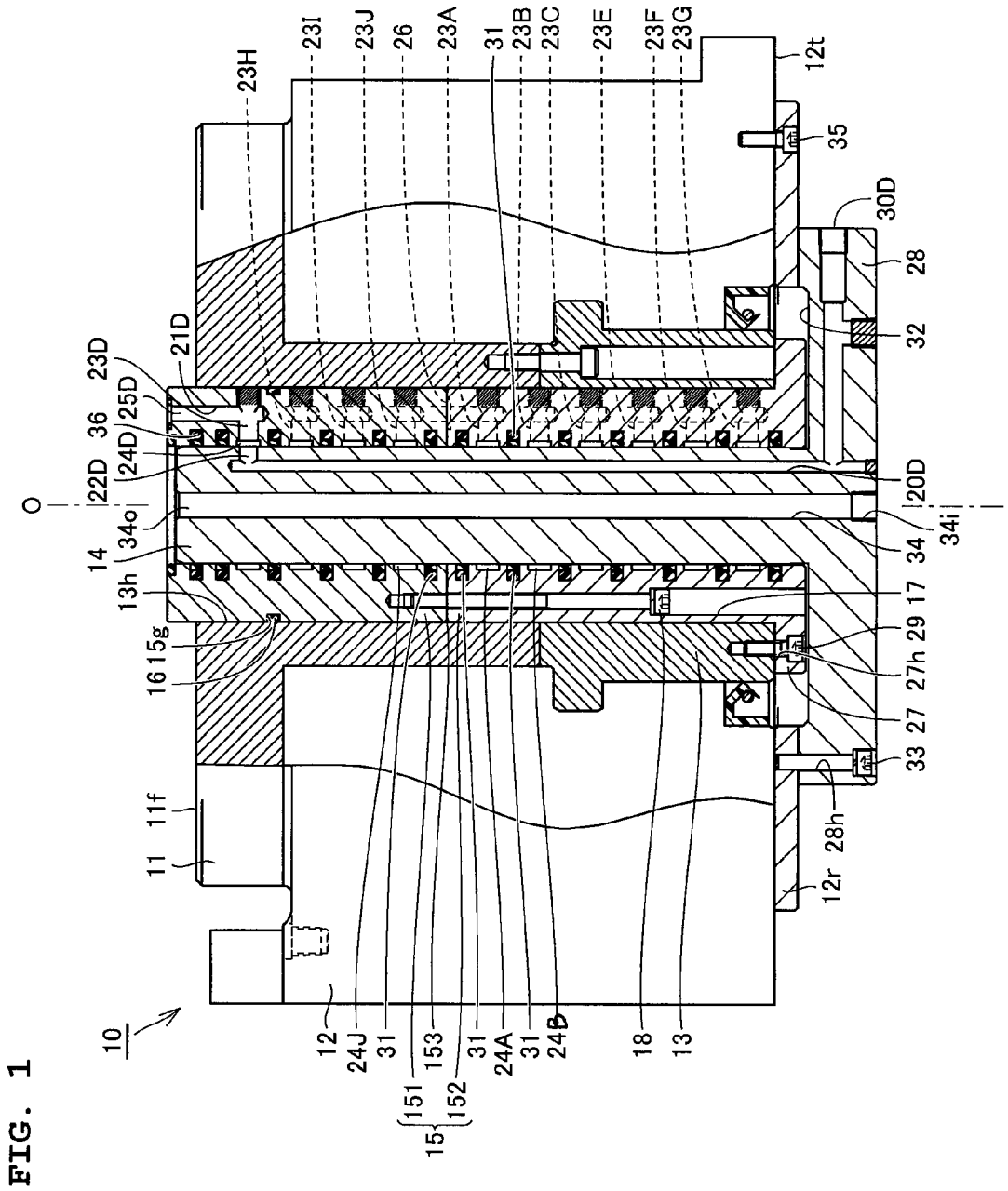
FIG. 1 is a cross-sectional side view showing a part of a rotary table assembly according to an embodiment of the present invention.
Figure 2:
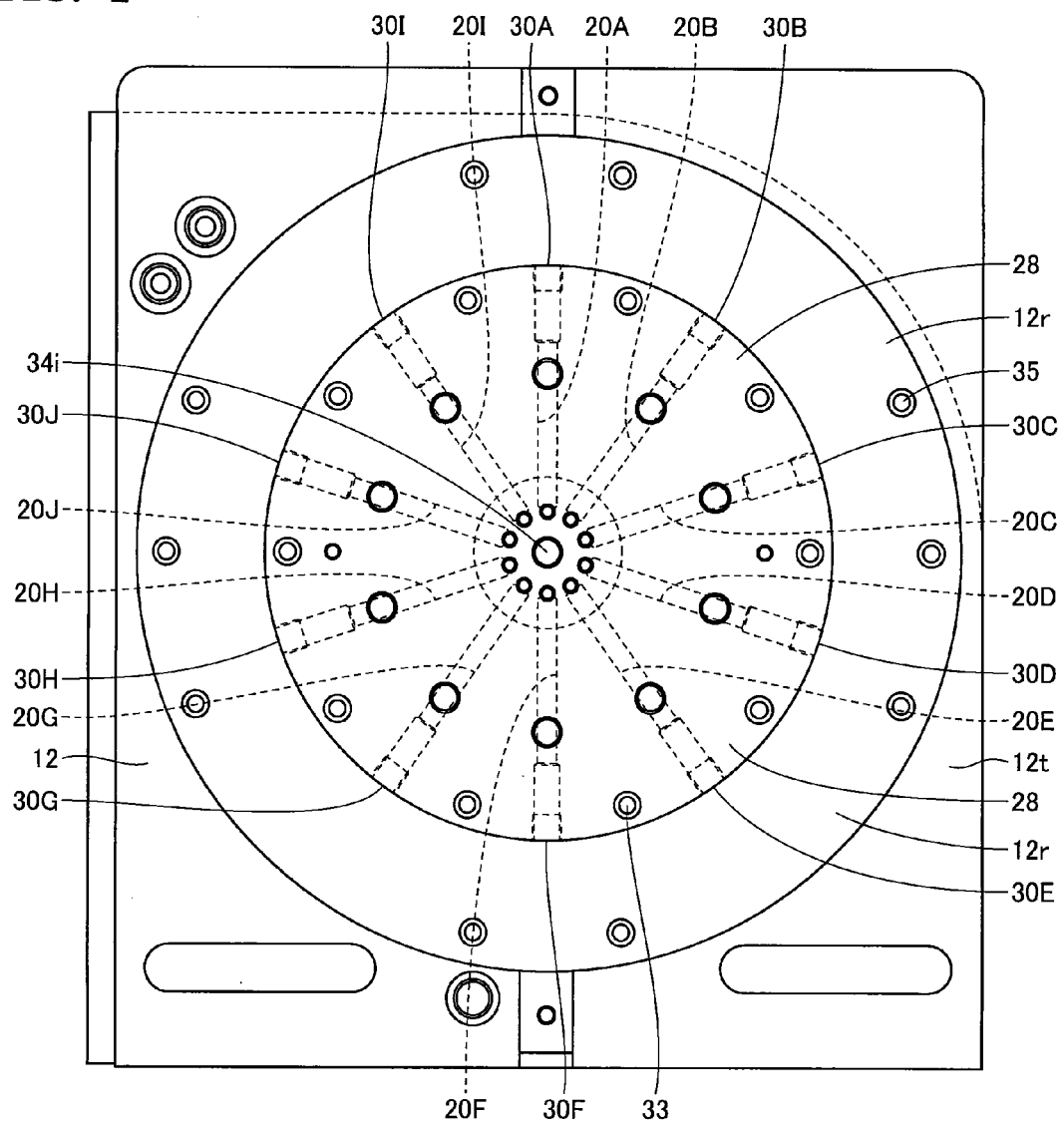
FIG. 2 is a bottom view of the embodiment.

An embodiment of the present invention will be described below in detail with reference to an exemplary rotary table assembly shown in the drawings. FIG. 1 is a cross-sectional side view partially showing the rotary table assembly according to the embodiment of the invention. For easy understanding of the present invention, the rotary table assembly in FIG. 1 is depicted without rolling bearings, driving devices and some other components. FIG. 2 is a bottom view of the rotary table assembly. A rotary table assembly 10 includes a rotatable table 11 and a frame 12 rotatably supporting the rotatable table 11 from the back surface of the rotatable table 11. The rotatable table 11 chucks a workpiece (not shown) on its front surface 11f. A hollow cylindrical center member 13 extends from the back surface of the rotatable table 11 along an axis O indicated by a dashed dotted line in FIG. 1. The rotatable table 11 is rotatably driven about the axis O by a driving device (not shown) attached to the frame 12 to move at a desired index angle through a controller (not shown) that detects the rotational position of the rotatable table 11 and controls the driving device. The frame 12 is a casing serving as a non-rotatable main body of the rotary table assembly and supports the rotatable table 11 with a rolling bearing (not shown) disposed around the center member 13.

The rotary table assembly 10 further includes a rotary joint that receives and supplies fluid between the rotatable table 11 and frame 12. This rotary joint extending along the axis O includes a circular columnar distributor 14 secured to the frame 12 and a hollow cylindrical center shaft 15 formed so as to encompass the outer peripheral surface of the distributor 14 and rotate with the rotatable table 11.

The distributor 14 extending along the axis O includes a basal portion, which is farther from the rotatable table 11, and a top region, which is closer to the rotatable table 11. At the basal portion of the distributor 14, a center flange 28 is formed so as to radially extend outward more than the top region. The center flange 28 is fixedly attached to the frame 12, while the top region of the distributor 14 is inserted into the center bore of the center shaft 15. The center shaft 15 can be separated in the axial direction in two, a rotatable-table-side center shaft 151 located on the side of the rotatable table 11 and a frame-side center shaft 152 located on the side of the frame 12. An annular groove 15g is formed on the outer peripheral surface of the rotatable-table-side center shaft 151 to receive an O ring 16 which is a ring-shaped sealing member. The O ring 16 prevents entry of foreign matter from the side of the front surface 11f of the rotatable table 11 into the interior of the rotary table assembly 10. A bolt hole 17 extending parallel with the axis O is formed in the frame-side center shaft 152 and receives a bolt 18 screwed from the back surface side of the rotatable table 11 so that the frame-side center shaft 152 is secured to the rotatable-table-side center shaft 151, thereby coupling the rotatable-table-side center shaft 151 and frame-side center shaft 152 at their mating surfaces 153.

The distributor 14 includes a plurality of frame-side fluid passages 20 formed therein, while the center shaft 15 includes a plurality of rotatable-table-side fluid passages 21 formed therein. In this embodiment, a total of ten fluid passages A to J are formed in parallel with each other. In the following description, indexes A to J may be added to distinguish the fluid passages on an as-needed basis.

With reference to FIG. 1, a frame-side fluid passage 20D and rotatable-table-side fluid passage 21D will be described as representatives of the plurality of fluid passages A to J. The frame-side fluid passage 20D extends from a communication port 22D formed on the outer peripheral surface of the top region of the distributor 14 to a port 30D formed on the basal portion of the distributor 14.

The rotatable-table-side fluid passage 21D extends from a communication port 23D formed on the inner peripheral surface of the center shaft 15 to a port 25D formed at an end surface of the center shaft 15, the end surface being close to the rotatable table. An annular groove 24D is formed on the inner peripheral surface of the center shaft 15 and at the same position as the communication port 23D in the axial direction.

The outer peripheral surface of the distributor 14 and the inner peripheral surface of the center shaft 15 face each other. The communication port 22D and the communication port 23D are formed at the same position in the axial direction and correspond to each other. While the center shaft 15 rotates with respect to the distributor 14, the communication port 22D formed on the distributor 14 is always oriented to the annular groove 24D connected with the communication port 23D. Accordingly, even if the center shaft 15 is at any rotational position, the communication port 22D of the frame-side fluid passage 20D is in communication with the communication port 23D of the rotatable-table-side fluid passage 21D. As a result, a single continuous fluid passage D from the port 30D to port 25D is formed.

In the same manner, communication ports 22A to 22J (not shown) of the frame-side fluid passages 20A to 20J are formed on the outer peripheral surface of the distributor 14 at intervals in the axial direction, and communication ports 23A to 23J of the rotatable-table-side fluid passages 21A to 21J and annular grooves 24A to 24J are formed on the inner peripheral surface of the center shaft 15 at positions corresponding to the communication ports 22, respectively, in the axial direction. The communication ports 22 and 23 communicate with each other. As a result, a single continuous fluid passage from a port 30A to a port 25A is formed and a single continuous fluid passage from a port 30B to a port 25B is formed. This formation continues until forming a single continuous fluid passage from the port 30J to port 25J, and consequently a total of ten fluid passages A to J are formed.

The frame-side fluid passages 20A to 20J are formed at different circumferential positions in the distributor 14. Specifically, the frame-side fluid passages 20 extend from the ports 30 through the center flange 28 inward in the radial direction, turn at some point at a right angle to extend through the top region of the distributor 14 in the axial direction toward the rotatable table 11, turn at some point at a right angle to extend outward in the radial direction toward the outer peripheral surface of the distributor 14, and reach the communication ports 22. To avoid complexity in the drawing, FIG. 1 does not show all of the frame-side fluid passages 20, but shows only the frame-side fluid passage 20D.

The rotatable-table-side fluid passages 21A to 21J are also formed at different circumferential positions in the center shaft 15. Specifically, the rotatable-table-side fluid passages 21 extend from the communication ports 23 outward in the radial direction, turn at some point at a right angle to extend in the axial direction toward the front surface of the rotatable table 11, and reach the ports 25. To avoid complexity in the drawing, FIG. 1 does not show all of the rotatable-table-side fluid passages 21, but indicates the positions of the communication ports 23A to 23J in the axial direction by dashed lines.

See the bottom view in FIG. 2 for the circumferential positions of the ports 30A to 30J. See the plan view in FIG. 3 for the circumferential positions of the ports 25A to 25J.

The ten fluid passages A to J can be grouped into first fluid passages and second fluid passages. The first fluid passages include first rotatable-table-side fluid passages 21D, 21H, 21I, 21J and first frame-side fluid passages 20D, 20H, 20I, 20J. The second fluid passages include second rotatable-table-side fluid passages 21A, 21B, 21C, 21E, 21F, 21G and second frame-side fluid passages 20A, 20B, 20C, 20E, 20F, 20G. The first rotatable-table-side fluid passages 21D, 21H, 21I, 21J are provided only in the rotatable-table-side center shaft 151. To avoid complexity in the drawing, FIG. 1 simply shows, by dashed lines, the second rotatable-table-side fluid passages 21A, 21B, 21C, 21E, 21F, 21G provided across the rotatable-table-side center shaft 151 and frame-side center shaft 152.

Figure 3:
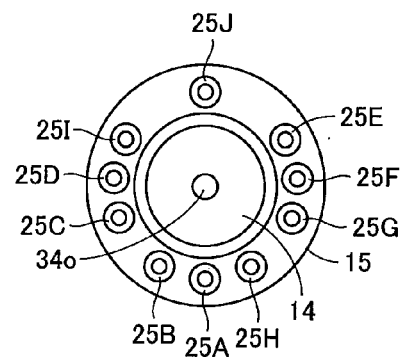
FIG. 3 is a plan view of a rotatable-table-side center shaft of the embodiment.

FIG. 3 is a plan view of the center shaft 15, or more specifically the rotatable-table-side center shaft 151, viewed from the front surface 11f of the rotatable table 11. As shown in FIG. 3, ports 25A to 25J are formed on an end surface of the center shaft 15. These ports 25A to 25J are end portions of the rotatable-table-side fluid passages 21A to 21J extending from the communication ports 23A to 23J to the front surface of the rotatable table 11. The center shaft 15 rotates with respect to the distributor 14.

Returning to FIG. 1, ring-shaped rotational seals 31 are disposed along the inner peripheral surface of the center shaft 15, each of which is positioned between the adjacent annular grooves 24, 24. The rotational seals 31 are arranged on both sides of the annular grooves 24 in the axial direction to seal the annular gaps between the distributor 14 and center shaft 15 and enclose the annular grooves 24, thereby keeping the annular grooves 24 air-tight or liquid-tight with the fluid flowing through the annular grooves 24. These rotational seals 31 prevent the fluid supplied from the ports 30 to ports 25 from leaking to the annular gaps and being mixed in the gaps.

The center shaft 15 will be described in detail. The rotatable-table-side center shaft 151, which is one of the components making up the center shaft 15, is inserted into a through hole 13h of the center member 13. The first rotatable-table-side fluid passages 21D, 21H, 21I, 21J among the rotatable-table-side fluid passages 21A to 21J, are formed only in the rotatable-table-side center shaft 151 without extending across the frame-side center shaft 152. The communication ports 23D, 23H, 23I, 23J are formed on the inner peripheral surface of the rotatable-table-side center shaft 151.

As described above, there are four communication ports 23 and five rotational seals 31 provided equidistantly on the inner peripheral surface of the rotatable-table-side center shaft 151 in the axial direction. In addition, a ring-shaped rotational seal 36 is further provided nearer to the front surface of the rotatable table 11 than are the rotational seals 31. The rotational seal 36 is used to seal the annular gap between the inner peripheral surface of the rotatable-table-side center shaft 151 and the outer peripheral surface of the distributor 14.

The frame-side center shaft 152, which is the other component of the center shaft 15, is inserted top end first into the through hole 13h of the center member 13. An outward flange 27 is formed at the basal portion of the frame-side center shaft 152 and bolt holes 27h are formed so as to penetrate the outward flange 27 to extend parallel with the axis O. The outer diameter of the outward flange 27 is larger than the inner diameter of the through hole 13h, and therefore the outward flange 27 is stopped at an end of the center member 13 remote from the front surface 11f of the rotatable table 11. A bolt 29 is screwed in each bolt hole 27h from the back surface side of the rotatable table, which fixedly attaches the frame-side center shaft 152 to the center member 13 of the rotatable table 11.

The frame-side center shaft 152 is fixedly coupled to the rotatable-table-side center shaft 151 with a bolt 18. This also fixedly attaches the rotatable-table-side center shaft 151 to the rotatable table 11.

Among the rotatable-table-side fluid passages 21A to 21J, the second rotatable-table-side fluid passages 21A, 21B, 21C, 21E, 21F, 21G run across the rotatable-table-side center shaft 151 and frame-side center shaft 152. The communication ports 23A, 23B, 23C, 23E, 23F, 23G are formed on the inner peripheral surface of the frame-side center shaft 152. Packings 26 are interposed between the mating surfaces 153 of the rotatable-table-side center shaft 151 and frame-side center shaft 152. The packings 26 are provided for the second rotatable-table-side fluid passages 21A, 21B, 21C, 21E, 21F, 21G. With these packings, the second rotatable-table-side fluid passages provided in the rotatable-table-side center shaft 151 and the second rotatable-table-side fluid passages provided in the frame-side center shaft 152 are connected at their mating surfaces 153 without gaps therebetween.

As describe above, there are six communication ports 23 and seven rotational seals 31 provided equidistantly on the inner peripheral surface of the frame-side center shaft 152 in the axial direction. Note that both the rotatable-table-side center shaft 151 and frame-side center shaft 152 are needed in order to communicate with all the communication ports 22 of the frame-side fluid passages 20, and the absence of either one of the shafts impairs the function of the center shaft 15.

Referring again to FIG. 1, a single rotational seal 31 is generally provided between the adjacent annular grooves 24; however, two rotational seals 31, 31 are provided between the adjacent annular grooves 24, 24 with the mating surfaces 153 therebetween so that the two rotational seals 31, 31 sandwich the mating surfaces 153. Therefore, two rotational seals 31, 31 are exceptionally provided between the annular groove 24J and annular groove 24A each positioned on each side of the mating surfaces 153. The double rotational seals further enhance the air tightness and liquid tightness at the interface between the fluid passages formed in the rotatable-table-side center shaft 151 and frame-side center shaft 152.

The distributor 14 will be described in detail. The top region of the distributor 14 in the shape of a circular column is inserted into a center bore of a hollow cylindrical center shaft 15. A center flange 28 is formed at the basal portion of the distributor 14. The center flange 28 has an outer diameter larger than that of the top region of the distributor 14.

On a surface, facing toward the rotatable table 11, of the center flange 28, a doughnut-shaped axially recessed portion 32 is formed to receive the outward flange 27 of the center shaft 15. On the outer edge of the center flange 28, jutting more than the outer diameter of the doughnut-shaped recessed portion 32, bolt holes 28h extending in the axial direction are formed to receive bolts 33 screwed therein, thereby fixedly attaching the outer edge of the center flange 28 to the back surface side of the frame 12.

As indicated by dashed lines in FIG. 2, the frame-side fluid passages 20 run radially in the center flange 28. A plurality of ports 30 are formed on the outer peripheral surface of the center flange 28.

As shown in FIG. 1, a center passage 34 is further provided in the distributor 14. The center passage 34 extending along the axis O includes a port 34o on the side of the rotatable table 11 and a port 34i on the side of the frame 12. The center passage 34 is used to apply a coolant flowing therethrough.

In this embodiment, a ring 12r is interposed between the back surface 12t of the frame 12 and the outer edge of the center flange 28 to increase an annular space defined by the doughnut-shaped recessed portion 32. The ring 12r is a component of the frame 12 and has an inner diameter equal to the outer diameter of the doughnut-shaped recessed portion 32. The ring 12r is fixedly attached to the back surface 12t of the frame 12 with a bolt 35.

Accordingly, the center flange 28 is indirectly secured to the frame 12 with the ring 12r. In an alternative modification (not shown), the center flange 28 can be directly secured to the frame's back surface 12t without the ring 12r.

Figure 4:
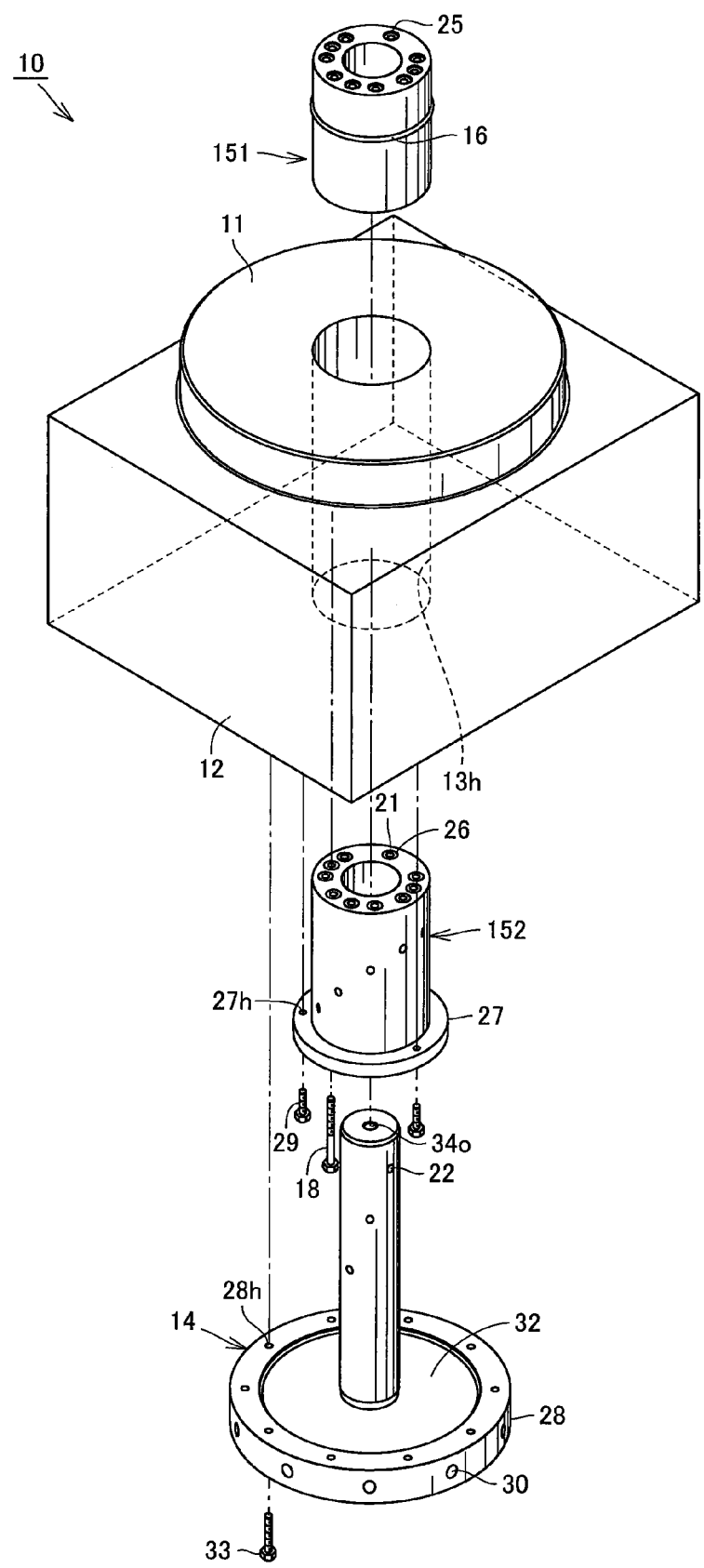
FIG. 4 is a perspective view schematically showing an assembling procedure of the embodiment.

FIG. 4 is a perspective view schematically showing an assembling procedure of the rotary table assembly 10, especially the rotary joint. While the rotatable table 11 is mounted on the frame 12, the rotatable-table-side center shaft 151 is inserted into the through hole 13h from the front surface side of the rotatable table 11, and the frame-side center shaft 152 is inserted into the through hole 13h from the back surface side of the rotatable table 11, or from the frame 12 side. Then, the rotatable-table-side center shaft 151 and frame-side center shaft 152 are secured to the rotatable table 11 with the bolts 18, 29 (some bolts and bolt holes are omitted in FIG. 4).

Next, the distributor 14 is inserted into the center bore of the center shaft 15 from the back surface side of the rotatable table 11, or from the frame 12 side, and secured to the frame 12 with the bolts 33 (some bolts are omitted in FIG. 4). Attachment of the rotary joint is completed in this manner. For checking the rotary joint and replacement of the sealing member 16 and rotational seals 31, 36, the rotatable table can be disassembled by reversing the steps. Specifically, the distributor 14 and frame-side center shaft 152 are pulled out from the back surface side of the rotatable table 11, and the rotatable-table-side center shaft 151 is pulled out from the front surface side of the rotatable table 11.

In a modified attachment procedure, bolt holes for receiving the bolts 18, 29 are made in the center flange 28, and the distributor 14 is inserted into the center bore of the frame-side center shaft 152 in advance. Then, the distributor 14 and frame-side center shaft 152 can be inserted together into the through hole 13*h* from the back surface side of the rotatable table 11 and secured with the bolts 18, 29, 33.

According to the embodiment, the rotary table assembly 10 is assembled by inserting the rotatable-table-side center shaft 151 with the O ring 16 attached around the outer peripheral surface thereof into the through hole 13*h* from the side of the front surface 11*f* of the rotatable table 11. The O ring 16 is pushed into a position relatively near the rotatable table 11 in the axial direction, while making sliding contact with the inner peripheral surface of the through hole 13*h*. This makes the distance over which the O ring 16 slides shorter in comparison with the case where the rotatable-table-side center shaft 151 is inserted from the back surface side of the rotatable table 11, and therefore can eliminate the possibility of the O ring 16 being twisted in the axial direction during insertion and can maintain the O ring 16 in the gap between the rotatable table 11 and center shaft 15 in an appropriate shape at an appropriate position.

According to the embodiment, the center shaft 15 can be axially separated in two on the border of mating surfaces 153. If the center shaft 15 is not configured to separate and is a single unit shaft, attachment and replacement of the rotational seals may be difficult because operators may not be able to reach the inner peripheral surface of the center shaft 15 that is long in the axial direction and has a small center bore in diameter. Separation of the center shaft 15 into the rotatable-table-side center shaft 151 and frame-side center shaft 152 facilitate attachment and replacement of the rotational seals 31.

According to the embodiment, the plurality of frame-side fluid passages 20 and plurality of rotatable-table-side fluid passages 21 allow simultaneous supply of air and liquid to the rotatable table 11. The air is used to confirm whether a workpiece is properly chucked on the front surface 11*f* of the rotatable table 11. The air is also used as an air blower for cleaning the rotatable table 11.

In this embodiment, hydraulic oil and air pressurized higher than the hydraulic oil can be simultaneously supplied from the ports 25 to the ports 30. This can be achieved by grouping the fluid passages so that air flows through the first rotatable-table-side fluid passages 21D, 21H, 21I, 21J formed only in the rotatable-table-side center shaft 151 and liquid flows through the second rotatable-table-side fluid passages 21A, 21B, 21C, 21E, 21F, 21G formed across the rotatable-table-side center shaft 151 and the frame-side center shaft 152.

According to the embodiment, the communication ports of the fluid passages for air are collectively located in the rotatable-table-side center shaft 151, which is one region in the axial direction, and the communication ports of the fluid passages for liquid are collectively located in the frame-side center shaft 152, which is the other region in the axial direction, thereby preventing air from leaking between the outer peripheral surface of the distributor 14 and the inner peripheral surface of the center shaft 15 and from entering the fluid passages, and vice versa. In addition, the present invention has an advantage in that the fluid passages for air do not cross the mating surfaces 153.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

The rotary table assembly according to the present invention is advantageously applied to machine tools.

What is claimed is:

1. A rotary table assembly comprising:
   a rotatable table having a through hole extending along an axis;
   a frame rotatably supporting the rotatable table from a back surface side of the rotatable table;
   a rotary joint including a hollow cylindrical center shaft having a plurality of rotatable-table-side fluid passages, and a distributor having a plurality of frame-side fluid passages and being inserted into a center bore of the center shaft, the rotary joint being disposed in the through hole to receive and supply fluid between the frame-side fluid passages and the rotatable-table-side fluid passages; and
   a sealing member interposed between an outer peripheral surface of the center shaft and a peripheral surface of the through hole, wherein
   the center shaft includes a rotatable-table-side center shaft that is inserted into the through hole from a front surface side of the rotatable table and has the outer peripheral surface making contact with the sealing member, and a frame-side center shaft that is inserted into the through hole from the back surface side of the rotatable table, wherein the frame-side center shaft and the rotatable-table-side center shaft are secured to the rotatable table and are hollow and cylindrical,
   the distributor includes a basal portion at a bottom end thereof adjacent to the frame and a top region axially extending from the basal portion, the top region is inserted from the back surface side of the rotatable table into a center bore of the frame-side center shaft and a center bore of the rotatable-table-side center shaft in succession, and the basal portion is secured to the frame,
   communication ports of first ones of the frame-side fluid passages formed on an outer peripheral surface of the top region are in communication with communication ports of first ones of the rotatable-table-side fluid passages formed on an inner peripheral surface of the rotatable-table-side center shaft, and communication ports of second ones of the frame-side fluid passages formed on the outer peripheral surface of the top region are in communication with communication ports of second ones of the rotatable-table-side fluid passages formed on an inner peripheral surface of the frame-side center shaft.

2. The rotary table assembly according to claim 1, wherein the rotary joint further includes a coupling member that fixedly couples the frame-side center shaft and the rotatable-table-side center shaft.

3. The rotary table assembly according to claim 2,
   wherein the first frame-side fluid passages extend axially in both the basal portion and the top region of the distributor, the first rotatable-table-side fluid passages extend axially only in the rotatable-table-side center shaft and not in the frame-side center shaft, the second frame-side fluid passages extend axially only in the basal portion and not in the top region of the distributor, and the second rotatable-table-side fluid passages extend axially in both the rotatable-table-side center shaft and the frame-side center shaft, and
   wherein one of air or liquid flows through the first frame-side fluid passages and the first rotatable-table-side fluid passages, while the other of air or liquid flows through the second frame-side fluid passages and the second rotatable-table-side fluid passages.

* * * * *